(12) United States Patent
Lenning

(10) Patent No.: US 7,478,836 B2
(45) Date of Patent: Jan. 20, 2009

(54) SEAT BELT ARRANGEMENT

(75) Inventor: Anders Lenning, Kungsbacka (SE)

(73) Assignee: Autoliv Development AB, Vargarda (SE)

( * ) Notice: Subject to any disclaimer, the term of this patent is extended or adjusted under 35 U.S.C. 154(b) by 393 days.

(21) Appl. No.: 10/507,292

(22) PCT Filed: Mar. 12, 2003

(86) PCT No.: PCT/SE03/00408

§ 371 (c)(1),
(2), (4) Date: Jul. 3, 2006

(87) PCT Pub. No.: WO03/070238

PCT Pub. Date: Sep. 18, 2003

(65) Prior Publication Data

US 2006/0255583 A1 Nov. 16, 2006

(30) Foreign Application Priority Data

Mar. 12, 2002 (GB) ................... 0205793.3

(51) Int. Cl.
*B60R 22/28* (2006.01)
(52) U.S. Cl. ...................... 280/805; 242/381
(58) Field of Classification Search ............... 280/805, 280/807; 180/268; 297/470, 471, 474–477; 242/379.1, 381
See application file for complete search history.

(56) References Cited

U.S. PATENT DOCUMENTS 5,765,774 A * 6/1998 Maekawa et al. ........ 242/390.9
6,019,392 A 2/2000 Karlow
6,045,076 A 4/2000 Daniels
6,105,894 A 8/2000 Singer et al.
6,616,081 B1 9/2003 Clute et al.
6,641,075 B2 11/2003 Specht
6,659,505 B1 12/2003 Knox

FOREIGN PATENT DOCUMENTS

| DE | 2 215 892 | 10/1973 |
|---|---|---|
| DE | 36 37 571 A1 | 5/1988 |
| DE | 199 48 661 C1 | 1/2001 |
| DE | 199 48 020 A1 | 4/2001 |
| DE | 199 63 580 A1 | 8/2001 |
| EP | 0 800 970 A1 | 10/1997 |
| EP | 1 022 201 A1 | 7/2000 |
| GB | 2 319 502 A | 5/1998 |
| JP | 10-297429 A | 11/1998 |
| JP | 2001-304331 | 10/2001 |
| WO | WO 98/36951 | 8/1998 |

* cited by examiner

Primary Examiner—John Q. Nguyen
Assistant Examiner—Robert A. Coker
(74) Attorney, Agent, or Firm—Brinks Hofer Gilson & Lione

(57) ABSTRACT

A seat-belt arrangement including an energy-absorbing force limiter. A first component, for example in the form of a retractor reel spool is movable relative to a second component, for example the frame-work of the retractor. The spool carries with it elements presenting friction faces which cooperate with further elements carried by the frame. A stack of Piezo-electric elements apply a compressional force driving together the elements having the friction faces to provide a controlled frictional energy-absorbing effect.

17 Claims, 4 Drawing Sheets

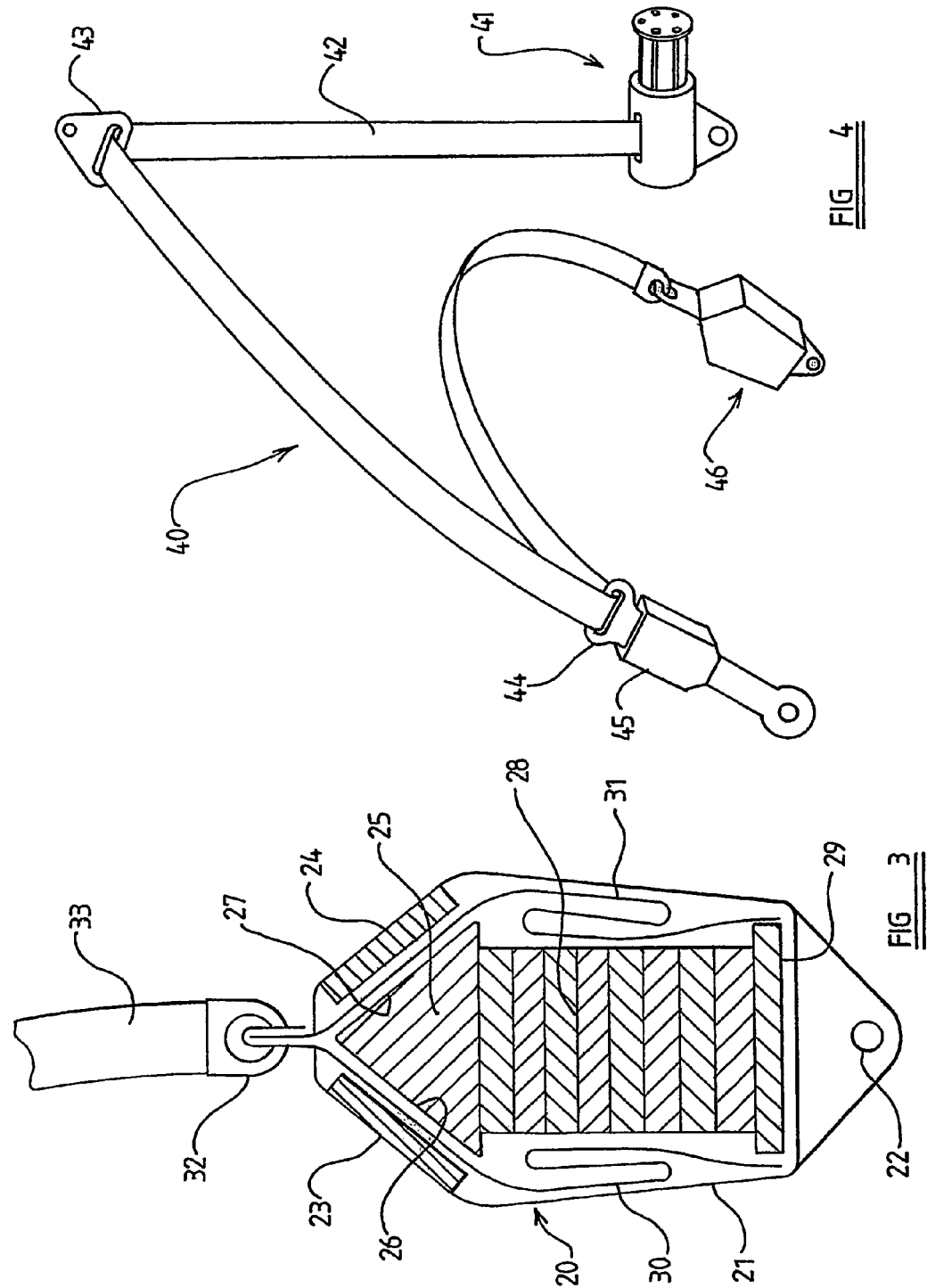

SEAT BELT ARRANGEMENT

CROSS REFERENCE TO RELATED APPLICATION

This application claims priority to GB 0205793.3 filed Mar. 12, 2002 and PCT/SE03/00408 filed Mar. 12, 2003.

BACKGROUND OF THE INVENTION

The present invention relates to a seat-belt arrangement incorporating a seat-belt and a force limiter.

It has been proposed to use force limiters, and in particular energy-absorbing force limiters, in connection with safety devices provided in motor vehicles such as, for example, seat-belts. The function of a force limiter is to yield, whilst absorbing energy, if the force limiter is subjected to a force in excess of a predetermined threshold. Whilst it is always desirable to ensure that an occupant of a vehicle should not accelerate or decelerate substantially with reference to the vehicle during an accident situation, it is known that it is undesirable to apply excessive forces to the torso of an occupant through a seat-belt in order to achieve this objective, since the application of high forces may injure the occupant of the vehicle. Thus, the effect of a force limiter is such that when a very substantial acceleration is to be imparted to a vehicle occupant by a safety-belt, the safety-belt will yield slightly, whilst the force limiter absorbs energy, thus minimizing the risk of injury arising.

Various types of force-limiting energy-absorbers have been proposed previously, including energy-absorbers which rely on the deformation of a metal element. Such arrangements are relatively simple and have a very predictable operating characteristic, but suffer from the disadvantage that it is not easy to vary the level of energy absorbed in response, for example, to the weight of the occupant of the seat or the position of the occupant of the seat immediately before commencement of the accident.

The energy absorbed by a force limiter as used in the context of a safety-belt in a motor vehicle is rather high, and thus many systems are relatively complex.

SUMMARY OF THE INVENTION

The present invention seeks to provide an improved seat-belt arrangement incorporating an energy-absorber.

According to this invention there is provided a seat-belt arrangement incorporating a seat-belt and an energy-absorbing force limiter, the force limiter comprising a first component and a second component, the first component presenting at least one friction surface, the second component presenting at least one co-operating surface, the friction surface and the co-operating surface lying immediately adjacent each other to allow a predetermined relative movement of the first component relative to the second component. The force limiter incorporates a force applying mechanism to apply a force to urge the surfaces against each other, the force applying mechanism comprising at least one element of an electro-deformable material, and means to apply a potential to the said at least one element.

An electro-deformable material is a material which will deform when an electric potential is applied to it. An element of such a material may expand in a specific direction when the potential is applied. Examples of such materials are Piezo-electric material and electrostrictive material. Preferably one or more of the elements is a Piezo-electric element.

Preferably the force applying mechanism comprises a stack of a plurality of the elements.

Conveniently a control arrangement is provided to control the potential applied to the element or elements in response to at least one input signal.

Preferably the force applying mechanism includes at least one sensor element, which is preferably a Piezo-electric element, to provide potential in response to a force being applied by the force applying mechanism, the potential being used as an input signal for the control arrangement.

Advantageously the control arrangement includes a calculator to calculate a desired value of belt force, and a device to measure actual belt force within the seat-belt and includes a comparator to compare the desired and the actual belt force to generate a control signal.

Preferably a force sensor is provided in a belt anchorage to measure the actual belt force.

Conveniently the calculator is provided with one or more input signals from one or more sensors adapted to sense the weight of a seat occupant, the position of a seat occupant, the violence of an accident or the interaction of an air-bag.

In one embodiment the predetermined movement of the first component relative to the second component has one or two degrees of freedom.

In an embodiment which will be described herein the motion between the first component and the second component is an angular motion.

In an alternative embodiment the motion between the first component and the second component is substantially linear.

In one preferred embodiment the first component has a plurality of friction surfaces, and the second component has a plurality of co-operating surfaces.

Preferably the surfaces are provided on lamellae which alternate with each other, the lamellae being mounted to be brought into firm engagement by the action of the force applying mechanism, alternate lamellae being fast with the first component and the second component respectively.

Conveniently a first set of lamellae are mounted to rotate with the spool of a retractor for the seat-belt, and the remaining lamellae are fast with the housing of the retractor.

Advantageously the first component is the spool of a safety-belt retractor, and the second component is the housing of the safety-belt retractor.

In an alternative embodiment the first component includes at least one length of strap, which may be part of the seat-belt itself and the second component includes a member which traps the strap against a fixed part, the force applying mechanism applying a force to the member tending to compress the strap against the fixed part.

Conveniently the first component is adapted to be connected to an end of the seat-belt, and the second component is adapted to be connected to an anchoring point within a motor vehicle.

In order that the invention may be more readily understood, and so that further features thereof may be appreciated, the invention will now be described, by way of example, with reference to the accompanying drawings in which:

BRIEF DESCRIPTION OF THE DRAWINGS

FIG. 3 is a diagrammatic sectional view of a seat-belt anchorage incorporating a force limiter in accordance with the invention, FIG. 4 is a view of a complete safety-belt system utilizing force limiters in accordance with the invention.

DETAILED DESCRIPTION OF THE INVENTION

In embodiments of the invention friction is used to absorb energy in a force limiter. It has been thought inappropriate to use friction to absorb energy in a force limiter since it is difficult to predict the force-resistive, or energy-absorbing, effect provided by friction, especially in connection with an item of apparatus which remains un-used for a long period of time, whilst suffering environmental changes such as temperature, pressure and humidity changes. Here it is to be understood that typically a force limiter does not operate unless the vehicle in which the force limiter is mounted is involved in a major accident. In many prior proposed force limiters, once the force limiter has operated, it is necessary for the force limiter to be replaced. Thus the force limiter remains mounted in a motor vehicle, often remaining unused for several years, but must be capable of operating in the desired manner at precisely the right moment whenever an accident occurs, providing exactly the desired force-limiting effect.

Figure 1:
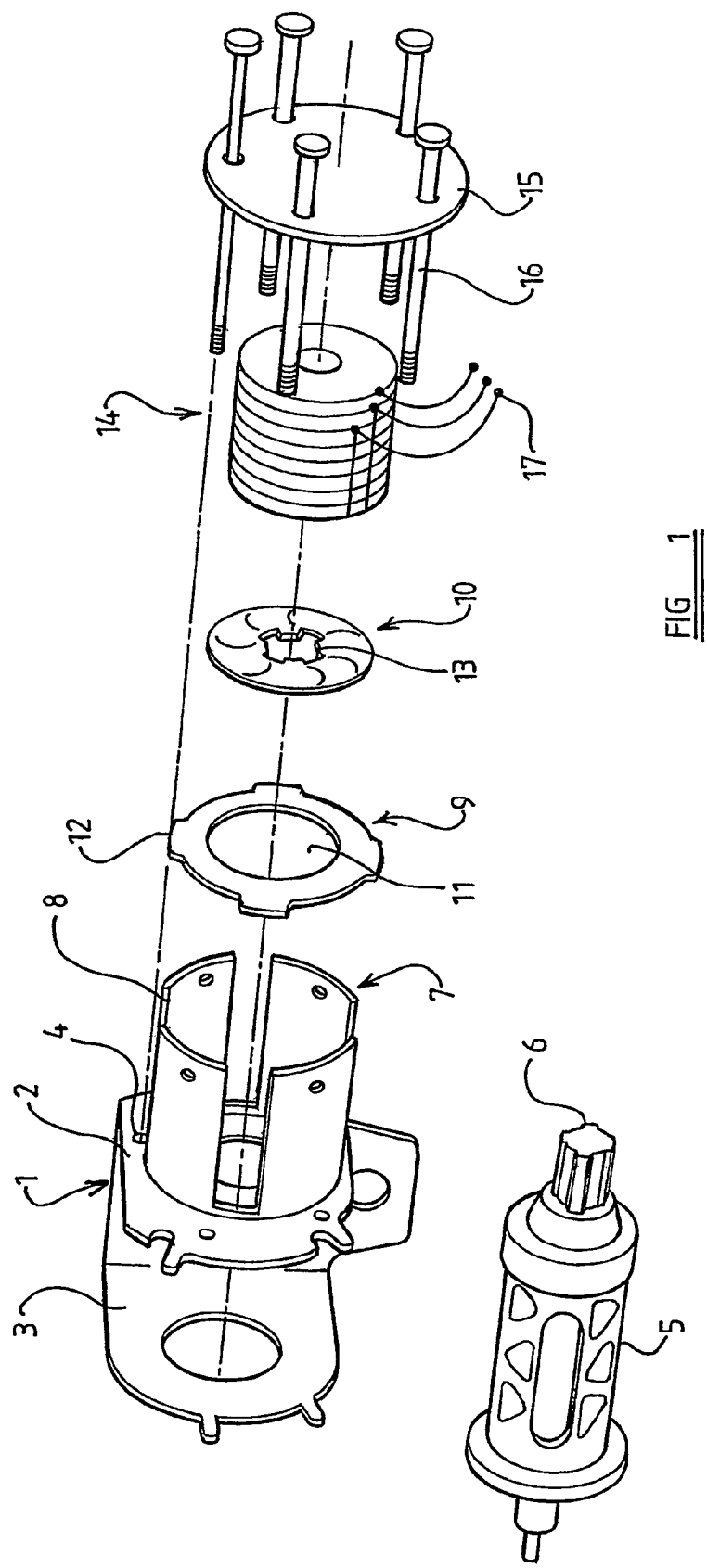
FIG. 1 is an exploded view of part of a safety-belt retractor incorporating a force limiter in accordance with the invention.
Figure 2:
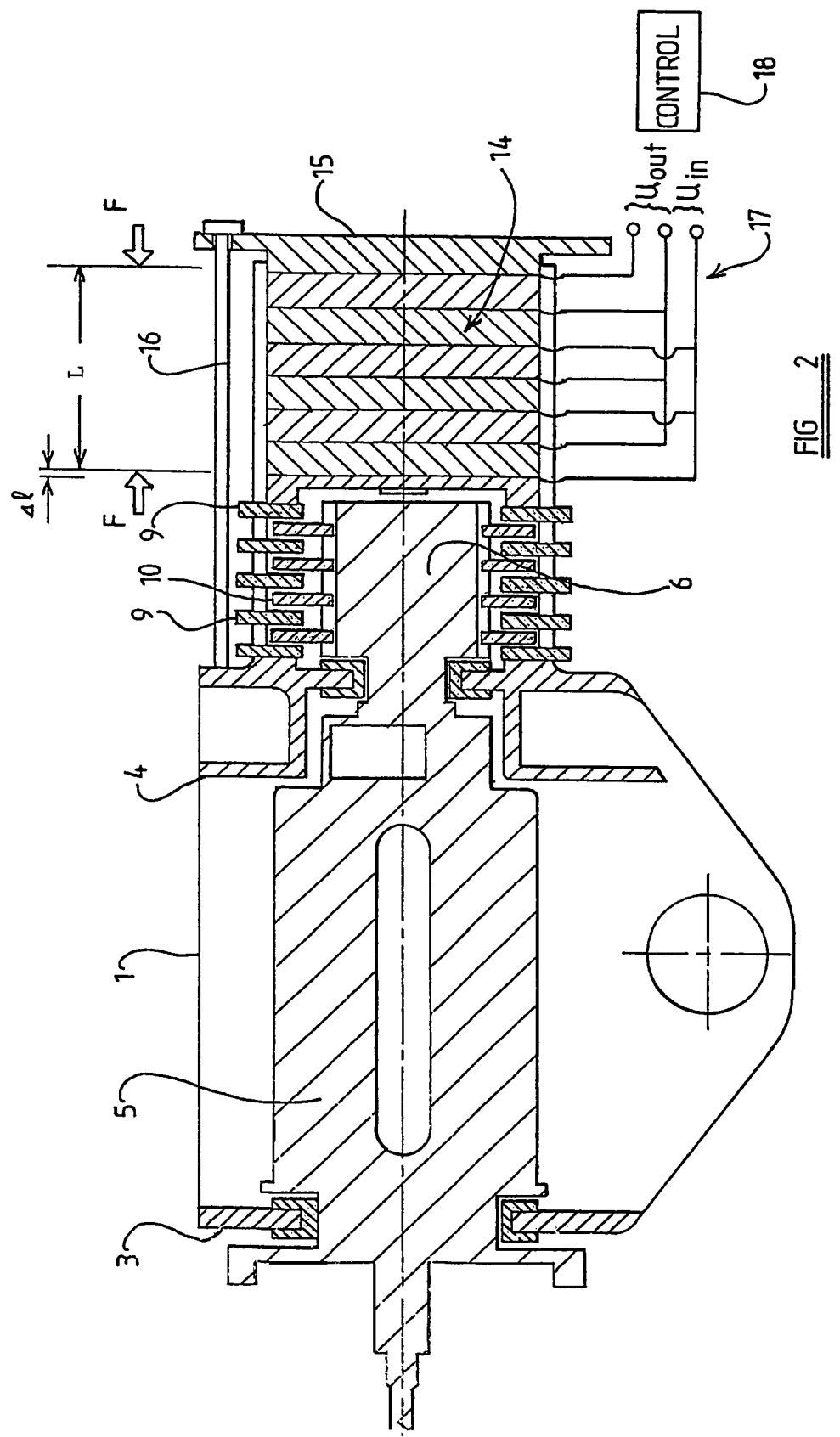
FIG. 2 is a cross-sectional view of the retractor of FIG. 1.

Referring now to FIGS. 1 and 2 of the accompanying drawings, a force limiter in accordance with the invention which is incorporated into a safety-belt arrangement will now be described.

A safety-belt retractor comprises a support frame 1 comprising a back-plate 2 and two parallel projecting side arms 3, 4 which support a spool 5 on which part of a safety-belt may be wound. The spool 5 is mounted so that it can rotate about its axis. The spool 5 is provided at one end with an axially projecting peg 6 of non-circular cross-section which extends beyond one side arm 4 of the frame 1. The side arm 4 of the frame 1 carries, on its outer surface, a generally cylindrical housing 7, the cylindrical housing being provided with four equi-angularly spaced slots 8 which extend the length of the housing. The housing 7 surrounds the projecting peg 6.

Received within the housing 7 are a plurality of lamellae, in the form of a plurality of non-rotatable discs 9, and a plurality of rotatable discs 10, the non-rotatable discs 9 and the rotatable discs 10 being alternated one with the other. Each non-rotatable disc 9 has a relatively large central aperture 11, and an outer periphery provided with four equi-angularly spaced radially outwardly directed lugs 12, the lugs being located and dimensioned to be received within the slots 8 provided in the housing 7. Each non-rotatable disc 9 may be slid into the housing 7. As each non-rotatable disc 9 is inserted into place within the housing 7, the lugs 12 are co-aligned with the slots 8.

Each rotatable disc 10 is of circular form, the diameter of each disc 10 being less than the internal diameter of the housing 7, so that each rotatable disc 10 may rotate without engaging the housing 7. Each rotatable disc 10 is provided with a central aperture 13, which has the same configuration as that of the non-circular cross-section of peg 6. Thus the rotatable disc 10, as it is inserted into the housing 7, has the aperture 13 thereof co-aligned with and engaged with the peg 6 so that the rotatable disc 13 will co-rotate with the peg 6.

Any desired number of non-rotatable discs 9 and rotatable discs 10 may be provided to form an assembly of discs. The discs may each present a high friction surface. It is preferred that a non-rotatable disc 9 is provided at each end of the assembly of fixed and rotatable discs.

The spool 5 and the rotatable discs 10 form a first component that can move angularly, that is to say rotationally, with two degrees of freedom of movement, relative to a second component constituted by the housing 7 on the retractor support frame 1 and the non-rotatable discs 9. The discs 10 are fast with the first component, as they rotate when the spool 5 rotates, and the discs 9 are fast with the second component, as they do not rotate, even when the spool 5 rotates. Adjacent the terminal fixed disc 9 is a stack 14 of elements formed from an electro-deformable material in the form of Piezo-electric plates. For simplicity in the present embodiment, only six Piezo-electric plates are shown mounted relative adjacent each other. In a practicable embodiment many more Piezo-electric plates, for example one hundred plates or more, could be used. The end of the stack 14 of Piezo-electric plates remote from the assembly of non-rotatable and rotatable discs 9, 10 is provided with a cover plate 15, the cover plate 15 being connected, by means of bolts 16, to the side arm 4 of the support frame 1 of the retractor.

Electrical contacts 17 are provided which can be utilized to apply a potential across a plurality of the Piezo-electric plates forming the stack 14, and also to receive an output signal generated by one of the Piezo-electric plates.

It is to be appreciated that in an ordinary condition of the retractor, as illustrated, the spool 5 of the retractor mechanism is able to rotate freely, as there is no significant friction generating contact between the adjacent non-rotatable and rotatable discs 9 and 10, as the non-rotatable and rotatable discs are free to move axially and will, naturally, become separated from one another sufficiently to permit free rotation of the spool 5. As the spool rotates, the rotatable discs 10 will rotate, but the non-rotatable discs 9 will not rotate.

However, if a potential is applied appropriately to the terminal 17, the stack of Piezo-electric plates 14, which initially has a length "L", will increase in length by a distance Δ 1 as the plates deform as a consequence of the potential applied to them. Thus the overall length of the stack is increased, and an axial force is applied to the non-rotatable disc 9, at the end of the plate assembly, forcing that disc towards the adjacent rotatable disc 10. The effect is that all of the non-rotatable discs and rotatable discs 9 and 10 come into firm contact with each other providing a frictional effect. This frictional effect is exhibited as a force-limiting and energy-absorbing effect experienced by the safety-belt on the spool 5. The magnitude of the effect depends upon the force applied by the Piezo-electric stack.

An output potential can be obtained from one Piezo-electric plate in the stack, that output potential being indicative of the change of force experienced within the stack with time, as a Piezo-electric material will generate a potential as a consequence of a force applied to the material. This output signal can be integrated to provide a resultant force signal, and consequently it is possible to determine, from the output potential, the actual force applied, by the stack of Piezo-electric plates to the non-rotating and rotating discs 9 and 10. Consequently, a control arrangement may control the potential applied to the stack 14 of Piezo-electric plates to ensure that the stack of plates provides an appropriate force to the non-rotating and rotating discs 9 and 10 so that the desired force-limiting or energy-absorbing effect is achieved. In the case of a retractor reel, as described, the control arrangement 18 may adjust the resistive force in dependence upon the weight of the occupant of the seat and/or the position of the seat immediately before commencement of an accident, and/or the position of the seat occupant relative to the seat and/or the violence of the accident and/or the interaction or effect of any air-bag provided to protect the occupant of the seat. The interaction or effect of an air-bag may be determined, for example, by measuring the speed of withdrawal of the safety-belt.

FIG. 3 illustrates a very different embodiment of the invention in the form of an end anchorage 20 for part of a safety-belt. The end anchorage 20 comprise a housing 21 provided with an integral mounting plate 22 by means of which the housing may be secured to a co-operating anchoring point provided within a motor vehicle.

An upper part of the housing defines two fixed guide plates 23, 24, which are inclined relative to each other, and, located between the guide plates, is a generally triangular friction element 25. The friction element 25 has two inclined faces 26, 27 which are adjacent and parallel to, but spaced from, the inner faces of the guide plates 23, 24. A Piezo-electric plate stack 28, equivalent to the stack 14 described above, is located between the element 25 and a transverse fixed plate 29 within the housing 21. Straps in the form of lengths of band, such as metal band 30, 31 are provided, each having a fixed end which is fixed firmly to a lower part of the housing 21, the band 30 passing between the face 26 and the guide plate 23, and the band 31 passing between the face 27 and the guide plate 24, the band 30 and 31 being secured to an eye 32 provided at the end of a safety-belt 33. The lengths of band 30, 31 is trapped between the faces 26, 27 of the friction element 25 and the fixed guide plates 23, 24.

When the end anchorage 20 is to operate to provide a force-limiting effect, a potential is applied to the plates within the stack 28 of Piezo-electric plates, thus causing the length of the stack to increase, pushing the triangular friction element 25 so that the faces 26 and 27 thereof firmly engage the adjacent surfaces of the band 30, 31, the band 30, 31 being guided and retained in position by the guide plates 23 and 24. The applied force tends to compress the band. Thus the frictional force experienced by the band if it is withdrawn from the housing is increased. The arrangement is such that the band 30, 31 may be withdrawn from the housing 20 with a linear movement with a force-limiting and energy-absorbing effect, thus permitting the eye 32 provided at the end of the safety-belt 21 to move in a desirable and predetermined way. Again, in the manner described above, the amount of force exerted by the stack of Piezo-electric plates 28 may be measured, by taking an output signal from one Piezo-electric plate within the stack, and may be controlled by adjusting the potential applied to the stack. Thus the energy-absorbing effect may be controlled.

A frangible element may connect the eye 32 to the housing 21 so that, in ordinary use of the seat-belt 33, no force is applied to the band 30, 31 tending to withdraw the band from the housing 21. However, if a substantial force is applied to the safety-belt 33, the frangible element will break, and the band 30, 31 will be withdrawn from the housing 21 with an energy-absorbing effect as described above.

FIG. 4 illustrates a complete safety-belt arrangement 40 which incorporates a retractor 41 of the type described with reference to FIGS. 1 and 2, the retractor being provided with a safety-belt 42 which passes through a pillar-loop 43, and which carries a tongue 44 which engages with a fixed buckle 45. The free end of the safety-belt 42 is connected to an anchorage 46 of the type described in FIG. 3.

Figure 5:
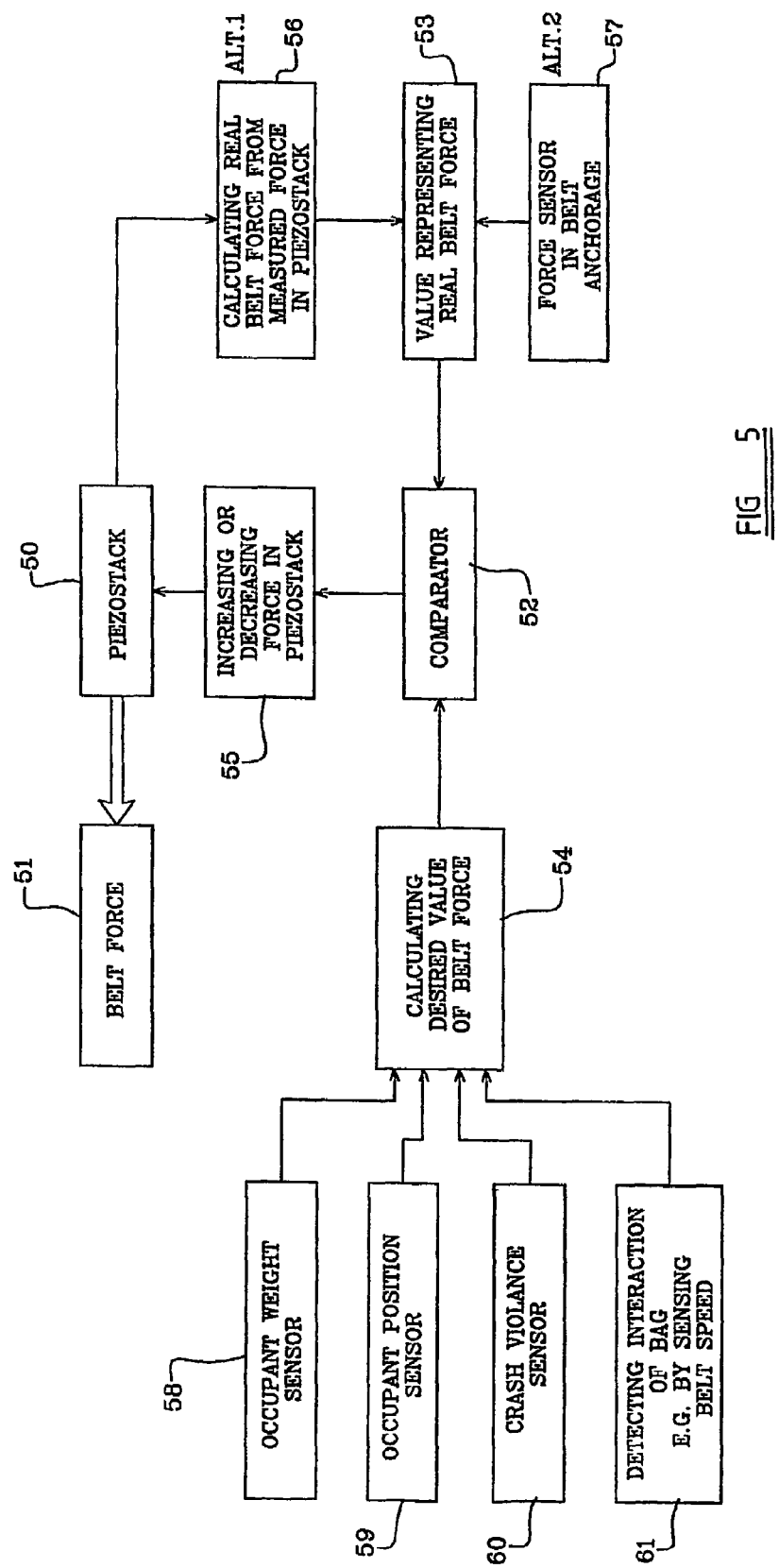
FIG. 5 is an explanatory block diagram of a control arrangement.

Referring now to FIG. 5 of the accompanying drawings, a control arrangement is described.

FIG. 5 illustrates, schematically, a stack 50 of Piezo-electric plates which may correspond with the stack 14 of the first described embodiment, or the stack 28 of the second described embodiment.

The stack 50 is shown exerting a particular belt force 51.

A comparator 52 is provided, the comparator 52 being adapted to compare a signal 53 which represents the real belt force, with a signal from a calculator 54 which calculates the desired belt force. The comparator serves to compare the real belt force with the calculated belt force, and to increase or decrease, 55, the force exerted by the Piezo-electric stack.

The value representing the real belt force may be determined either by utilizing a device such as calculator 56, which calculates the real belt force from the measured force exerted by the Piezo-electric stack, although alternatively a second type of device 57 can be provided in the form of a sensor incorporated within a seat-belt anchorage adapted to measure the force exerted on the sensor by the seat-belt. This force sensor may be provided at the terminal end anchorage of the safety-belt, the buckle anchorage or the retractor anchorage. Alternatively, a sensor responsive to the torque of the spool of the retractor could be used.

The calculator 54 is associated with one or more sensors adapted to sense different parameters and to provide signals to the calculator.

A first sensor 58 is an occupant weight sensor adapted to sense the weight of the occupant of the relevant seat. This may be of any conventional design.

The second sensor 59 is an occupant position sensor adapted to sense the position of the occupant within the seat. Again this may be of any conventional design.

The third sensor is a crash violence detector which, again, may be of any conventional design.

The fourth sensor is to sense and detect the interaction of any air-bag provided to protect the occupant of the relevant seat. The interaction of the air-bag is, in other words, the effect that the air-bag has on the seat occupant. This can be measured by sensing the speed of withdrawal of safety-belt from the retractor, but may alternatively be estimated from the timing of the inflation of the air-bag, and the initial position of the occupant of the seat.

It is thus to be understood that there are many ways of determining the value representing the real belt force, and many ways of calculating the desired value of belt force, relying on signals from sensors adapted to sense many different parameters.

Since the stack 50 of Piezo-electric plates 50 can respond very quickly to changes in the input voltage, the belt force 51 can be adjusted, in a predetermined manner, during the very brief period of time that constitutes a typical crash or accident event.

While the above description constitutes the preferred embodiment of the present invention, it will be appreciated that the invention is susceptible to modification, variation and change without departing from the proper scope and fair meaning of the accompanying claims.

The invention claimed is:

1. A seat-belt arrangement incorporating a seat-belt and an energy-absorbing force limiter, the force limiter comprising a first component and a second component, the first component presenting at least one friction surface, the second component presenting at least one co-operating surface, the friction surface and the co-operating surface lying immediately adjacent each other to allow a predetermined relative movement of the first component relative to the second component, the force limiter incorporating a force applying mechanism to apply a force to urge said surfaces against each other, the force applying mechanism comprising at least one element of an electro-deformable material, and means to apply a potential to the said at least one element.

2. An arrangement according to claim 1 where the electro-deformable material includes a Piezo-electric element.

3. An arrangement according to claim 1 wherein the force applying mechanism comprises a stack of a plurality of said elements.

4. An arrangement according to claim 1 wherein a control arrangement is provided to control the potential applied to the element in response to at least one input signal.

5. An arrangement according to claim 4 wherein the force applying mechanism includes at least one sensor element, to provide a potential in response to a force being applied by the said force applying mechanism, said potential being used as an input signal for the control arrangement.

6. An arrangement according to claim 4 wherein the control arrangement includes a calculator to calculate a desired value of belt force within said seat-belt, and a device to measure actual belt force and includes a comparator to compare the desired and the actual belt force to generate a control signal.

7. An arrangement according to claim 6 wherein a force sensor is provided in a belt anchorage to measure the actual belt force.

8. An arrangement according to claim 6 wherein the calculator is provided with one or more input signals from one or more sensors adapted to sense one or more of the weight of a seat occupant, the position of a seat occupant, the violence of an accident, or the interaction of an air-bag.

9. An arrangement according to claim 1 wherein the predetermined movement of the first component relative to the second component has one or two degrees of freedom.

10. An arrangement according to claim 1 wherein the motion between the first component and the second component is an angular motion.

11. An arrangement according to claim 1 wherein the motion between the first component and the second component is substantially linear.

12. An arrangement according to claim 1 wherein the first component has a plurality of the friction surfaces, and the second component has a plurality of the co-operating surfaces.

13. An arrangement according to claim 12 wherein the friction and co-operating surfaces are provided on lamellae which alternate with each other, the lamellae being mounted to be brought into firm engagement by the action of the said force applying mechanism, alternate lamellae being fastened with the first component and the second component respectively.

14. An arrangement according to claim 13 wherein a first set of lamellae are mounted to rotate with the spool of a retractor for the seat-belt, and a second set of the remaining lamellae are fastened with the housing of the retractor.

15. An arrangement according to claim 1 wherein the first component is the spool of a safety-belt retractor, and the second component is the housing of the safety-belt retractor.

16. An arrangement according to claim 1 wherein the first component includes at least one length of strap, and the second component includes a member which traps the strap against a fixed part, the force applying mechanism applying a force to said member tending to compress the strap against the fixed part.

17. An arrangement according to claim 1 wherein the first component is adapted to be connected to an end of the seat-belt, and the second component is adapted to be connected to an anchoring point within a motor vehicle.

* * * * *